(12) United States Patent
Sonntag

(10) Patent No.: US 11,458,583 B2
(45) Date of Patent: Oct. 4, 2022

(54) SUCTION-EXTRACTION ATTACHMENT

(71) Applicant: Robert Bosch GmbH, Stuttgart (DE)

(72) Inventor: Stefan Sonntag, Vogt (DE)

(73) Assignee: Robert Bosch GmbH, Stuttgart (DE)

( * ) Notice: Subject to any disclaimer, the term of this patent is extended or adjusted under 35 U.S.C. 154(b) by 224 days.

(21) Appl. No.: 16/649,938

(22) PCT Filed: Oct. 9, 2018

(86) PCT No.: PCT/EP2018/077393
§ 371 (c)(1),
(2) Date: Mar. 23, 2020

(87) PCT Pub. No.: WO2019/086211
PCT Pub. Date: May 9, 2019

(65) Prior Publication Data
US 2021/0370456 A1 Dec. 2, 2021

(30) Foreign Application Priority Data
Oct. 30, 2017 (DE) ..................... 10 2017 219 449.9

(51) Int. Cl.
*B23Q 11/00* (2006.01)
(52) U.S. Cl.
CPC ...... *B23Q 11/0046* (2013.01); *B23B 2270/30* (2013.01); *B23B 2270/62* (2013.01); *B23Q 11/0071* (2013.01)
(58) Field of Classification Search
CPC ............ B23Q 11/0046; B23Q 11/0071; B23B 2270/30; B23B 2251/68; B23B 2270/62
See application file for complete search history.

(56) References Cited

U.S. PATENT DOCUMENTS

| 2,041,689 | A | * | 5/1936 | Baumeister | ........... E21B 21/015 |
| | | | | | 173/60 |
| 5,033,917 | A | | 7/1991 | McGlasson et al. | |

(Continued)

FOREIGN PATENT DOCUMENTS

| AT | 516022 A4 | 2/2016 |
| CA | 2178028 A1 | 10/1997 |

(Continued)

OTHER PUBLICATIONS

International Search Report corresponding to PCT Application No. PCT/EP2018/077393, dated Jan. 23, 2019 (German and English language document) (7 pages).

*Primary Examiner* — Eric A. Gates
*Assistant Examiner* — Paul M Janeski
(74) *Attorney, Agent, or Firm* — Maginot, Moore & Beck LLP

(57) ABSTRACT

A suction-extraction attachment for an insertion tool includes a housing, a bearing unit, and a suction-extraction opening. The housing has an end-side opening that is configured to accommodate the insertion tool. The bearing unit is configured to mount the suction-extraction attachment on the insertion tool. The suction-extraction opening is configured to couple the suction-extraction attachment to a suction-extraction device. The end-side opening and the suction-extraction opening form a transporting channel. The suction-extraction attachment is configured to be mounted on the insertion tool via the bearing unit in an axially movable and rotatable manner such that a position of the suction-extraction attachment relative to the insertion tool alters as a drill-hole depth increases.

14 Claims, 8 Drawing Sheets

(56) References Cited

U.S. PATENT DOCUMENTS

| | | |
|---|---|---|
| 2014/0033794 A1 | 2/2014 | Reinhardt et al. |
| 2015/0040341 A1 | 2/2015 | Wiedemann et al. |
| 2017/0203402 A1 | 7/2017 | Machida et al. |

FOREIGN PATENT DOCUMENTS

| | | |
|---|---|---|
| CN | 2346548 Y | 11/1999 |
| CN | 201023139 Y | 2/2008 |
| CN | 101517405 A | 8/2009 |
| CN | 101573613 A | 11/2009 |
| CN | 101855042 A | 10/2010 |
| CN | 103339499 A | 10/2013 |
| CN | 103502809 A | 1/2014 |
| CN | 203945346 U | 11/2014 |
| CN | 204139961 U | 2/2015 |
| CN | 204935583 U | 1/2016 |
| CN | 205799417 U | 12/2016 |
| CN | 106660201 A | 5/2017 |
| CN | 106863231 A | 6/2017 |
| CN | 106944668 A | 7/2017 |
| DE | 278 079 A1 | 4/1990 |
| DE | 10 2005 062 888 A1 | 7/2007 |
| DE | 20 2007 010 514 U1 | 11/2007 |
| DE | 10 2013 215 792 A1 | 2/2015 |
| DE | 10 2016 202 248 A1 | 8/2017 |
| EP | 0 799 674 A1 | 10/1997 |
| EP | 2 508 299 A1 | 10/2012 |
| EP | 2 567 779 A1 | 3/2013 |
| EP | 2 567 779 B1 | 2/2014 |
| EP | 2 732 914 B1 | 1/2017 |
| GB | 2 005 403 A | 4/1979 |
| JP | 2014-163409 A | 9/2014 |
| WO | 2016/049667 A1 | 4/2016 |
| WO | 2016/165997 A1 | 10/2016 |

* cited by examiner

SUCTION-EXTRACTION ATTACHMENT

This application is a 35 U.S.C. § 371 National Stage Application of PCT/EP2018/077393, filed on Oct. 9, 2018, which claims the benefit of priority to Serial No. DE 10 2017 219 449.9, filed on Oct. 30, 2017 in Germany, the disclosures of which are incorporated herein by reference in their entirety.

BACKGROUND

The disclosure relates to a suction-extraction attachment for an insert tool, comprising a housing having a front opening that is designed to receive the insert tool, a bearing unit for mounting the suction-extraction attachment on the insert tool, a suction-extraction opening for coupling the suction-extraction attachment to a suction-extraction device, wherein the front opening and the suction-extraction opening form a transport channel.

DE 10 2005 062 888 A1 describes a dust collection attachment for connection to a suction-extraction means designed to collect drilling dust during drilling operations. The dust collection attachment is fastened to the hand-held power tool.

SUMMARY

Proceeding from the prior art, it is proposed that the suction-extraction attachment be mounted on the insert tool in an axially movable and rotatable manner by means of the bearing unit, in such a manner that the position of the suction-extraction attachment relative to the insert tool alters as a drill-hole depth increases. An optimum suction-extraction result can thus be achieved with a very simply constructed suction-extraction attachment.

The insert tool may be realized, for example, as a drilling tool, in particular as a masonry, wood or metal drill, as a chisel, etc. In particular, the insert tool is realized as a drilling tool that is designed for a hammer drill or a rotary percussion drill. Along its longitudinal axis, the insert tool has an insertion end, a shank region and a drilling head. At its end that faces away from the drilling head, the insert tool has the insertion end, which is designed to be coupled to the hand-held power tool. Preferably, in the region of the insertion end the insert tool is realized in such a manner that the insert tool can be coupled to a tool receiver of the hand-held power tool. As an example, in the region of the insertion end the insert tool may have form-fit elements, realized as special grooves, that form an SDS-plus interface or an SDS-max interface. For the purpose of performing work on a workpiece, the insert tool is put into a rotating and/or linearly oscillating, or percussive, state by means of the hand-held power tool. During the work operation, the drilling tool penetrates the workpiece, in the direction of advance of the drilling tool. The longitudinal axis of the drilling tool corresponds, in particular, to a work axis or rotation axis of the drilling tool. A drilling head in this context is to be understood to mean, in particular, a region of the drilling tool that has at least one cutting body. The cutting body has at least one cutting element. The at least one cutting element is made, in particular, from a hard metal. Preferably, the outer diameter of the drilling head is greater than the outer diameter of the shank region. The outer diameter of the drilling head is formed, in particular, by at least one cutting body.

The housing of the suction-extraction attachment may be of a single-part or multipart design. In the single part design, the suction-extraction attachment can be connected to the insert tool, in particular, by being pushed on. The suction-extraction attachment may be pushed over the insertion end with the front opening leading or over the drilling head with the rear opening leading. When connected, the front opening faces toward the drilling head of the insert tool. If the housing is of a multipart design, for example in two parts and connected by a hinge, it would also be conceivable for the suction-extraction attachment to be connected to the insert tool via the shank region of the insert tool. As an example, for the purpose of connection the suction-extraction attachment may be folded around the shank region and snapped into the fastened position by means of connecting elements. When connected, the bearing unit preferably limits the degree of freedom of movement of the suction-extraction attachment to two. In particular, the suction-extraction attachment has a translational degree of freedom and a rotational degree of freedom on the drilling tool. In particular, the rotational degree of freedom is perpendicular to the translational degree of freedom.

The suction-extraction opening may be integral with the housing. The suction-extraction opening may be realized, for example, as a connection piece or other device, known to persons skilled in the art, for connecting a housing to a suction-extraction device or to a suction hose. The cross section, or diameter, of the suction-extraction opening corresponds substantially to the cross section, or diameter, of the front opening. In particular, the cross section, or diameter, of the front opening is only slightly smaller than the cross section, or diameter, of the suction-extraction opening, in order to ensure the highest possible air volume flow in the transport channel. The bearing unit is arranged, at least partially, in the transport channel. The transport channel may have a straight or a curved profile.

Furthermore, it is proposed that the front opening have a substantially flat contact surface, and that the contact surface enclose a longitudinal axis of the suction-extraction attachment, wherein the longitudinal axis corresponds to a work axis of the insert tool. Advantageously, the ergonomics of the suction-extraction attachment can be improved by the contact surface. Preferably, the contact surface extends, in particular, perpendicularly in relation to the longitudinal axis.

Furthermore, it is proposed that the housing, in the region of the front opening, have at least one cutout that interrupts the contact surface. Advantageously, the air volume flow in the transport channel can be increased by means of the cutout. In particular, the cutout forms a region over which the suction-extraction attachment, in particular the housing of the suction extraction attachment, is spaced apart from a flat workpiece while work is being performed. Preferably, the cutout is arranged on a side of the suction-extraction attachment that faces away from the suction-extraction opening.

It is additionally proposed that the cutout have a mid-point angle around the longitudinal axis of at least 10°, in particular at least 30°, preferably at least 60°, more preferably at least 90°. Advantageously, a sufficiently large air volume flow in the transport channel can thus be achieved. The suction-extraction attachment may have a single larger cutout, having a mid-point angle of more than 60°, or a plurality of smaller cutouts, each having a mid-point angle of at most 60°. It is also possible to combine larger and smaller cutouts. Differing arrangements for the plurality of cutouts are conceivable, including, inter alia, adjacent to each other, uniformly spaced apart from each other, arranged rotationally symmetrically or mirror-symmetrically in relation to the longitudinal axis, or the like.

Furthermore, it is proposed that the contact surface be intersected twice by at least one straight line that is perpendicular to the longitudinal axis. In particular, the contact surface is realized in such a manner that it is additionally intersected twice by a further straight line, which is perpendicular to the first straight line. It is thereby possible, advantageously, to realize secure holding of the suction-extraction attachment on the workpiece without tilting.

Furthermore, it is proposed that the contact surface be circular or oval. In particular, the contact surface is at least partially concave.

It is additionally proposed that the housing, in the region of the front opening, have a fixing element that is designed to increase static friction between the workpiece on which work is to be performed and the suction-extraction attachment. In particular, the contact surface is formed, at least partially, by the fixing element. Preferably, the fixing element is realized as a rubber lip. Alternatively, it is also conceivable for the housing, in the region of the contact surface, to have a surface structuring that increases the friction. Advantageously, the suction-extraction attachment, or the insert tool, can thereby be prevented from slipping on the workpiece.

Furthermore, it is proposed that the bearing unit have an immovable, in particular immovable and cylindrical, bearing element, wherein the immovable bearing element is designed, in particular, for mounting the suction-extraction attachment without play or mounting it with play. Advantageously, an inexpensive suction-extraction attachment can thus be realized.

Furthermore, it is proposed that the bearing unit have at least one movable bearing element, which is designed, in particular, for mounting the suction-extraction attachment without play. In particular, the bearing unit has at least two movable bearing elements, which are movable relative to each other. In particular, the movable bearing element is designed to apply a force to the drilling tool. Preferably, the movable bearing element is designed to center the insert tool, or to position the suction-extraction attachment, with respect to the drilling tool. The length of the bearing unit is, in particular, at least 0.25, preferably at least 0.5, more preferably at least 0.75 of the length of the suction-extraction attachment, in order, advantageously, to realize secure mounting with a compact design of the suction-extraction attachment.

It is additionally proposed that the suction-extraction attachment have an actuating element, by means of which the position of the movable bearing elements can be set. This advantageously enables the connection to be adapted manually.

Furthermore, it is proposed that the movable bearing element be coupled to a deformable region of the housing. Advantageously, a deformation of the housing can be used to adapt the connection of the suction-extraction attachment to the drilling tool.

It is additionally proposed that the movable bearing element be made from a plastic, in particular at least partially integrally with the housing, or from a metallic material.

Furthermore, the disclosure relates to a system comprising a suction-extraction device and a suction-extraction attachment as previously described. It is proposed that a minimum suction force of the suction-extraction attachment on a workpiece on which work is to be performed be greater than a frictional force between the suction-extraction attachment and the insert tool. Advantageously, it is thereby possible to prevent rotation of the suction-extraction attachment while work is being performed on the workpiece.

BRIEF DESCRIPTION OF THE DRAWINGS

Further advantages are given by the following description of the drawings. The drawings, the description and the claims contain numerous features in combination. Persons skilled in the art will also expediently consider the features individually and combine them to form appropriate further combinations. References of features of differing embodiments of the disclosure that substantially correspond are denoted by the same number and by a letter identifying the embodiment.

There are shown.

DETAILED DESCRIPTION

Figure 1:
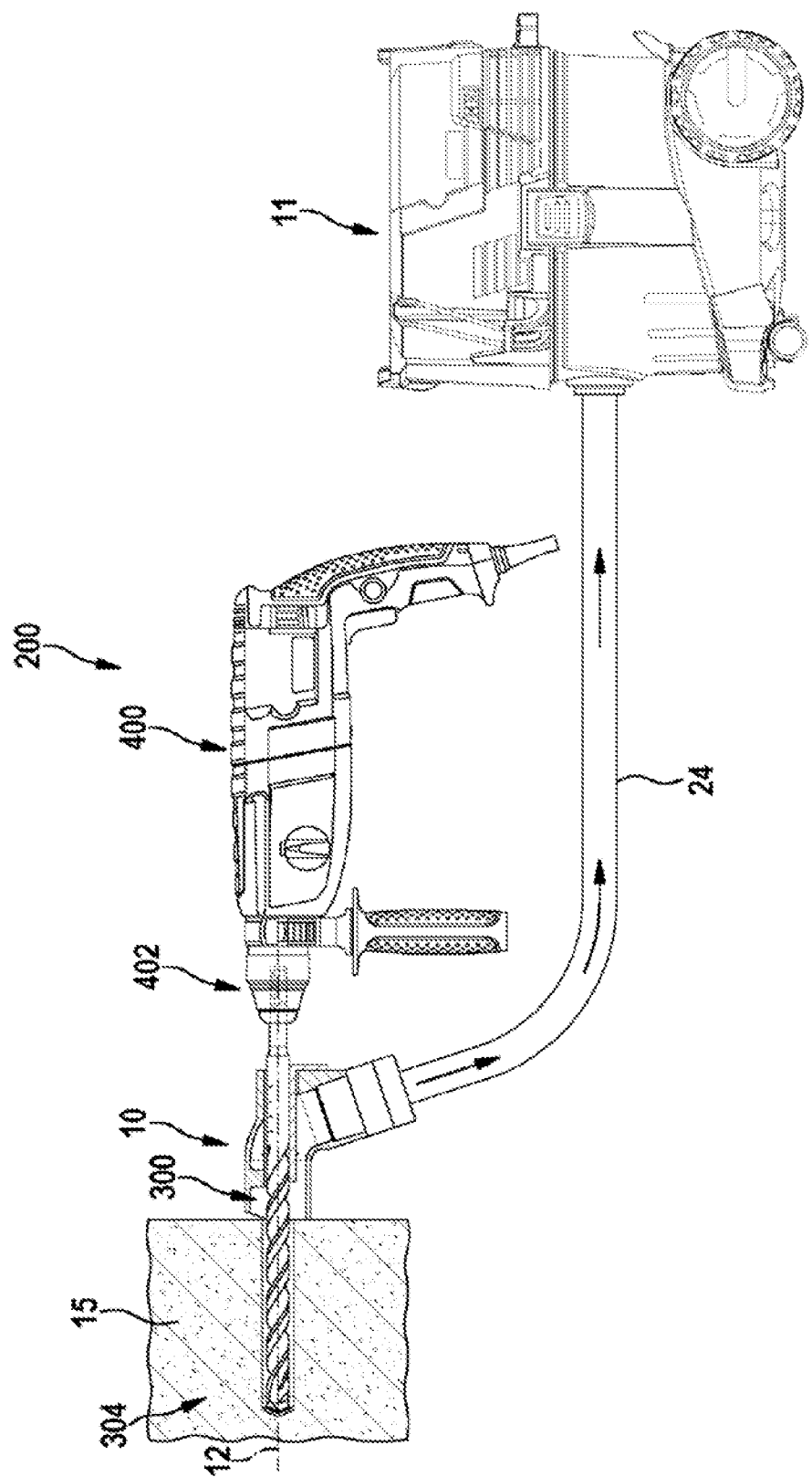
FIG. 1 a schematic view of a tool system.

FIG. 1 shows a schematic view of a tool system 200. The tool system 200 comprises an insert tool 300, a hand-held power tool 400, a suction-extraction attachment 10 and a suction-extraction device 11. The hand-held power tool 400 is realized as a hammer drill, for example. The hand-held power tool 400 has a tool receiver 402, which is designed to receive an insert tool 300, for example realized as a drilling tool 302. The hand-held power tool 400 has a drive unit, not represented, which comprises an electric motor, and a transmission that comprises a pneumatic percussion mechanism. By means of the drive unit and the transmission, the drilling tool 302, when coupled, can be driven rotationally about a longitudinal axis 12, and in a linearly oscillating, or percussive, manner along the longitudinal axis 12. The insert tool 300 is realized as a drilling tool 302, in particular as a masonry drill.

Figure 2A:
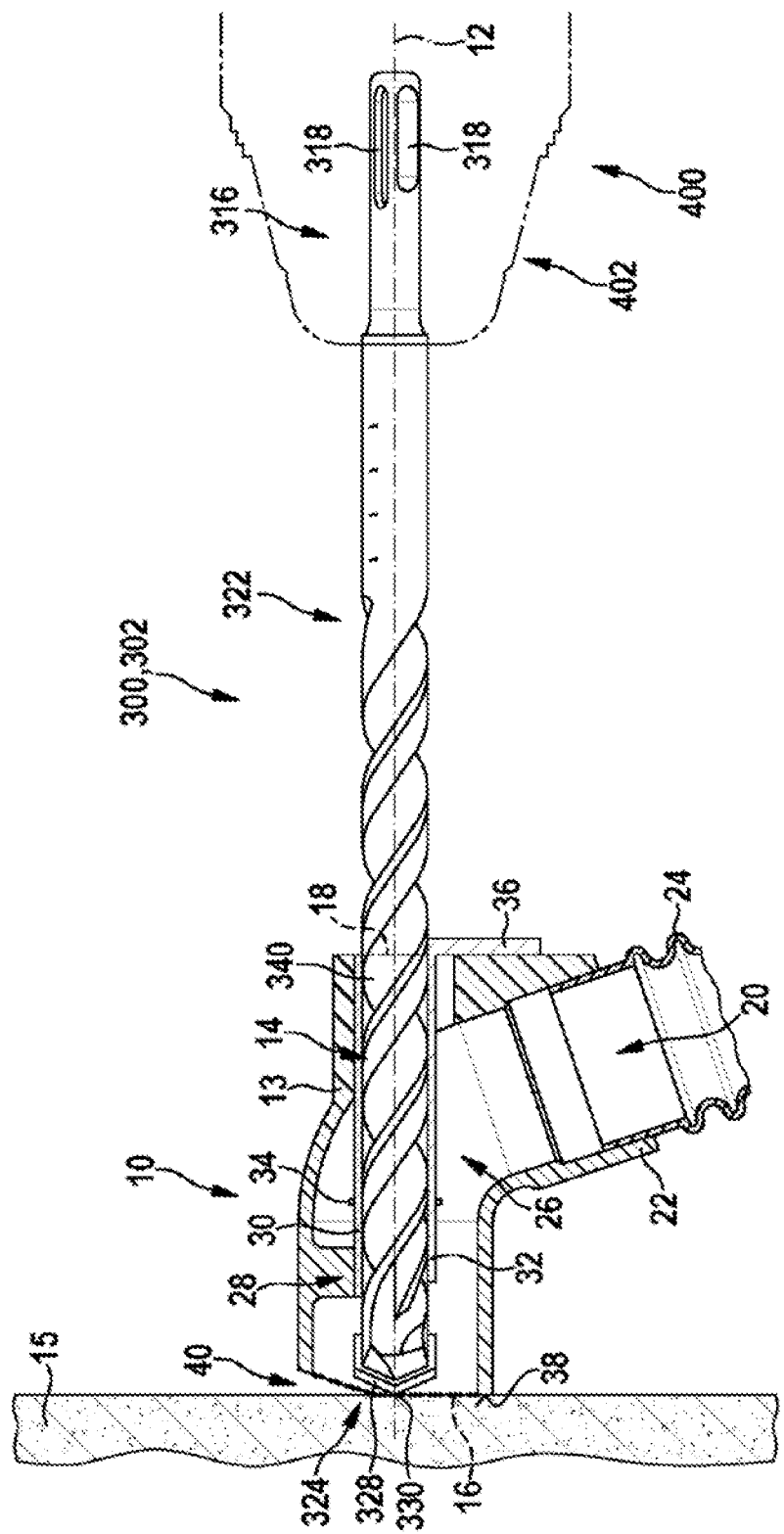
FIG. 2a a longitudinal section of a first embodiment of a suction-extraction attachment.
Figure 2B:
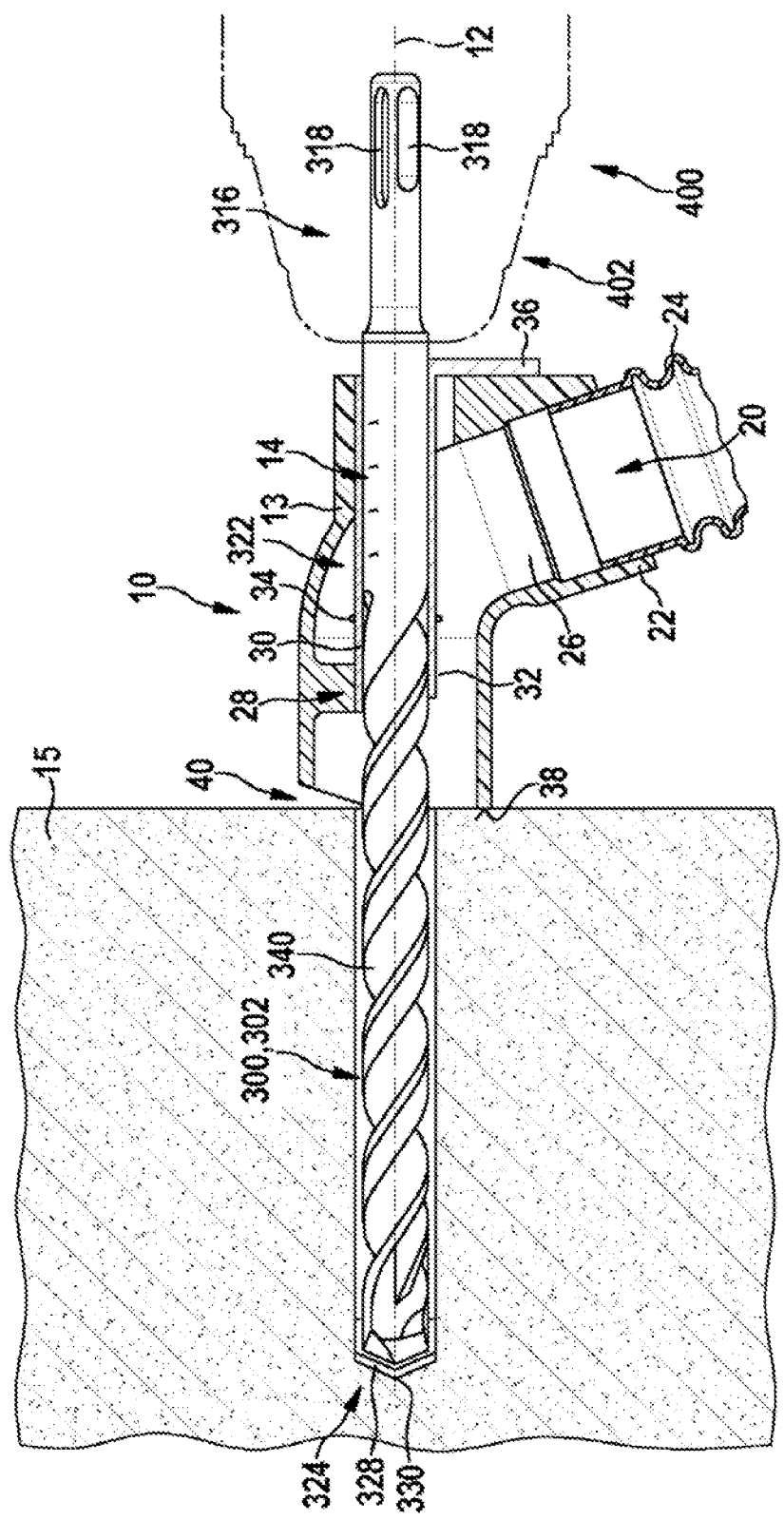
FIG. 2b a further longitudinal section of the first embodiment of the suction-extraction attachment.

The drilling tool 302 connected to the suction-extraction attachment 10 is shown in FIG. 2a before the drilling operation, or during the spot-drilling operation, and in FIG. 2b it is shown inside the drill hole, during the drilling operation. The drilling tool 302 is designed, in particular, to produce a drill hole in a workpiece 15, for example a masonry wall. The drilling tool 302 has an insertion end 316 that is designed for coupling the drilling tool 302 to the hand-held power tool 400. The insertion end 316 is substantially cylindrical, and has form-fit elements 318, which are realized as elongate grooves. The tool receiver 402 of the hand-held power tool 400 has corresponding form-fit elements, not represented, which, when coupled, are connected to the form-fit elements 318 of the drilling tool 302.

Starting from the insertion end 316, the drilling tool 302, along its longitudinal extent, has a shank region 322 and a drilling head 324. The front end of the drilling tool 302 is formed by the drilling head 324, and the rear end of the drilling tool 302 is formed by the insertion end 316. The drilling tool 302 has a shank element 340 that forms the shank region 322 and the insertion end 316. In the shank region 322, the drilling tool 302 has a spiral conveying flute, which is realized as an outer groove in the shank element 340, extending spirally around the longitudinal axis 12. Alternatively, it is also conceivable for the drilling tool 302 not to have a conveying flute, or to have a differently designed conveying flute.

The drilling head 324 has a cutting body 328 at the front, which ends in a pointed tip 330. The cutting body 328 is realized, for example, as a hard-metal insert that is inserted in a front recess in the shank element 340 and connected to the latter in a materially bonded manner by means of a soldered connection. Alternatively, it is also conceivable for the cutting body 328 to be realized as a solid hard-metal head, which is fastened in a materially bonded manner to a front, blunt surface of the shank element 340 by means of a welded connection. The outer diameter of the drilling head 324 is usually greater than the outer diameter of the drilling tool 302 in the shank region 322, in order to prevent the drilling tool 302 from tilting or binding in the drill hole. In particular, the outer diameter of the drilling head 324 is determined by the cutting body 328.

The suction-extraction attachment 10 has a housing 13, which is made from a plastic. The housing 13 is realized, for example, as a single piece, and has a coupling region 14 arranged between a front opening 16 and a rear opening 18 in the housing 13. When connected, the drilling tool 302 is arranged in the coupling region 14. Furthermore, the suction-extraction attachment 10 has a suction-extraction opening 20, which is designed for coupling the suction-extraction attachment 10 to the suction-extraction device 11. The suction-extraction opening 20 is realized, for example, as a connection piece 22. The connection piece 22 is realized integrally with the housing 13. In particular, the connection piece 22 is of a conical shape. In particular, the inner diameter of the housing 13 decreases continuously in the region of the connection piece 22. As an example, the suction-extraction attachment 10 may be connected, via the connection piece 22, to the suction-extraction device 11, realized as an industrial suction unit, by means of a hose 24 (see FIG. 1).

The front opening 16 is connected to the suction-extraction opening 20 in such a manner that a transport channel 26 is formed. Within the transport channel 26, an air flow can move, preferably substantially unhindered, from the front opening 16 to the suction-extraction opening 20.

The suction-extraction attachment 10 has a bearing unit 28, which is designed to mount the suction-extraction attachment 10 on the insert tool 300. The coupling region is delimited radially by the bearing unit 28, and axially by the front opening 16 and the rear opening 18. The bearing unit 28 is realized as a radial bearing. The bearing unit 28 comprises an immovable bearing element 30 and a movable bearing element 32, which are connected by means of a restoring element 34. The ratio of the length of the bearing unit to the length of the suction-extraction attachment is approximately 0.75. The immovable bearing element 30 is realized as a V-shaped rail, which is realized in an immovable manner on the housing 13 of the suction-extraction attachment 10. The drilling tool 302 bears tangentially against two lateral faces of the immovable bearing element 30. Alternatively, it is also conceivable for the immovable bearing element to be integral with the housing 13. The movable bearing element 32 is likewise realized as a rail, having a cross section shaped as a circular arc. The restoring element 34 is realized, in particular, as a spring clamp that at least partially encompasses the bearing elements 30, 32. The restoring element 34 is arranged inside the suction-extraction attachment 10. The restoring element radially applies a force to the movable bearing element 32, in particular a force directed towards the immovable bearing element 30. In particular, the movable bearing element 32 is held by the restoring element 34. In particular, the movable bearing element 32 is tiltable. The immovable bearing element 30 terminates with the rear opening 18, while the movable bearing element 32 extends to the outside through the rear opening 18 and forms an actuating element 36 outside the housing 13. The movement of the actuating element 36 is preferably coupled to that of the movable bearing element 32. In particular, the actuating element 36 and the movable bearing element 32 are formed as one piece. Via the actuating element 36, a force can be applied manually to the movable bearing element 32 in the opposite direction to the force of the reset element 34.

Preferably, the suction-extraction attachment 10 is realized in such a manner that it can be connected to a drilling tool 302 that is connected to the hand-held power tool 400. To make the connection, the suction-extraction attachment 10 with its rear opening 18 is pushed over the drilling head 324 of the drilling tool 302. As already described, the drilling tool 302 in the region of the drilling head 324 has a greater diameter than the drilling tool 302 in the shank region 322. In order to increase, or maximize, the distance between the bearing elements 30, 32 in the region of the rear opening 18, the position of the movable bearing element 32 can be adjusted manually via the actuating element 36. The distance between the bearing elements 30, 32 is kept substantially constant by the drilling head 324 while the drilling head 324 is being moved between them. When the suction-extraction attachment 10 is pushed on further, the drilling head 324 exits the bearing unit 28. Since the drilling tool 302 has a smaller and constant diameter in the shank region, the movable bearing element 32 is thereupon pressed in the direction of the drilling tool 302 by means of the restoring element 34, such that the suction-extraction attachment 10 comes to be mounted, substantially without play, on the drilling tool 302. The suction-extraction attachment 10 is thus mounted in an axially movable manner on the drilling tool 302. In addition, the bearing unit 28 corresponds substantially to a plain bearing, such that it is possible for the drilling tool 302 to rotate within the suction-extraction attachment 10 as work is being performed on the workpiece 15. Advantageously, mounting without play results in centering of the drilling tool 302, or suction-extraction attachment 10.

Before the drilling operation is started, the suction-extraction attachment 10 can advantageously be pushed backward, in the direction of the hand-held power tool 400, on the drilling tool 302, such that there is a clear view of the pointed tip 330 of the drilling tool 302. The pointed tip 330 can thus be placed at the desired position on the workpiece 15. Then, with the suction-extraction device 11 switched on, the suction-extraction attachment 10 can be pushed forward until a contact surface 38 bears against the workpiece 15. The contact surface 38 is flat, and arranged in the region of the front opening 16. A negative pressure, by means of which the suction-extraction attachment 10 is held on the workpiece 15 during the drilling operation, is generated within the transport channel 26 by the suction-extraction device 11. Advantageously, the suction-extraction attachment 10 assists the user in positioning the drilling tool 302 on the workpiece 15, since, owing to the negative pressure, the drilling tool 302 centered in the suction-extraction attachment 10 is considerably better protected against slippage. In addition, the suction-extraction attachment 10 has a cutout 40 in the region of the front opening 16. The cutout 40 interrupts the flat contact surface 38 and, as an example, is arranged above the longitudinal axis 12, while the suction-extraction opening 20 is arranged below the longitudinal axis 12. The cutout 40 is designed, in particular, to increase the air volume flow in the transport channel 26.

FIG. 2b shows the tool system 200 during the drilling operation. The drilling tool 302 moves with progressive depth into the workpiece 15, or drill hole, while the suction-extraction attachment 10 is pressed against the workpiece 15 by the negative pressure. There is thus a relative movement of the drilling tool 302 with respect to the suction-extraction attachment 10. Since the suction-extraction attachment 10 bears against the workpiece via the contact surface 38, all drill dust or drill cuttings can be effectively collected and sucked away by the suction-extraction attachment 10.

Figure 2C:
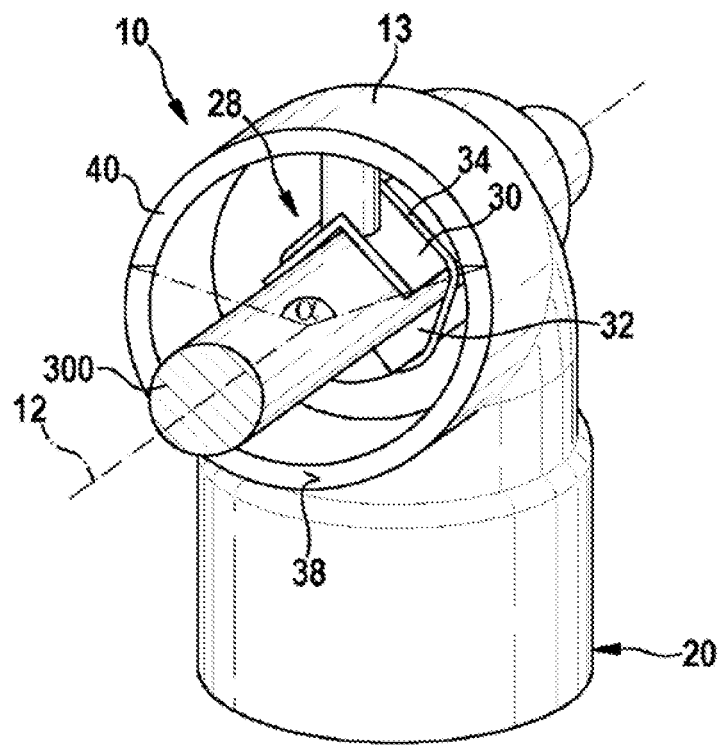
FIG. 2c a perspective view of the first embodiment of the suction-extraction attachment.

FIG. 2c shows a perspective view of the front side of the suction-extraction attachment 10. In this and the following drawings, the insert tool 300 is indicated schematically. In the region of the front opening 16 the suction-extraction attachment 10 has, in particular, a single, relatively large cutout 40. The cutout 40 has a mid-point angle α of over 120° relative to the longitudinal axis. The cutout 40 interrupts the flat contact surface 38 in such a manner that an air flow can enter the suction-extraction attachment 10. The contact surface 38 is shaped as a circular arc, and extends substantially perpendicularly in relation to the longitudinal axis 12.

Figure 3A:
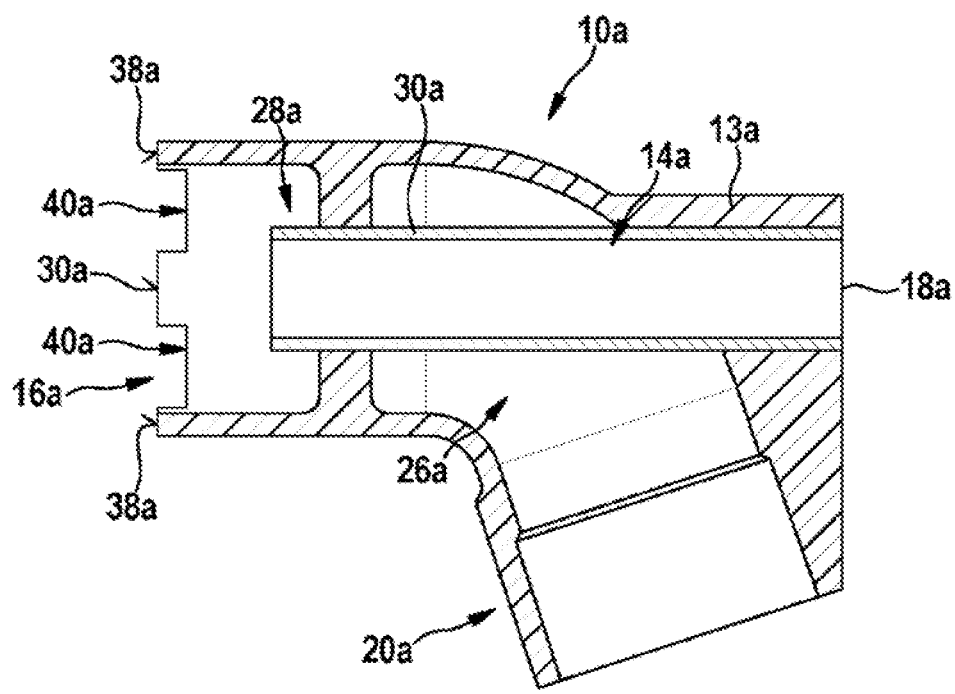
FIG. 3a a longitudinal section of a second embodiment of the suction-extraction attachment.
Figure 3B:
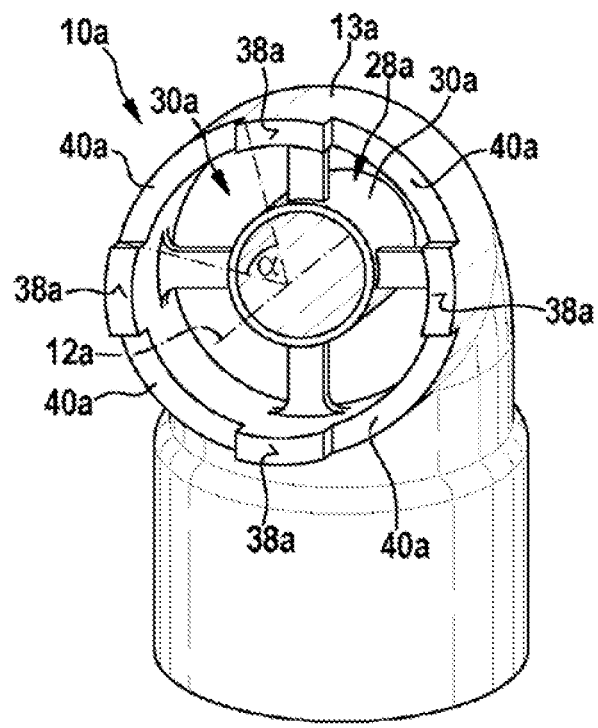
FIG. 3b a perspective view of the second embodiment of the suction-extraction attachment.

FIG. 3a and FIG. 3b show an alternative embodiment of the suction-extraction attachment 10a, in a longitudinal section and in a perspective view of the front. The suction-extraction attachment 10a differs, in particular, in the design of the bearing unit 28a and the contact surface 38a. The bearing unit 28a has a single immovable bearing element 30a. The bearing element 30a is made, for example, from a metallic material, and connected in a materially bonded manner to the housing 13a made from plastic. It is also conceivable, however, for the movable bearing element 30a to be integral with the housing 13a, and thus to be made from plastic. The bearing element 30a is cylindrical. In particular, the bearing element 30a is realized as a tube of a constant diameter. The diameter of the bearing element 30a is selected in such a manner that the drilling head 324 of the drilling tool 302 can be received via the rear opening 18a. The insert tool 300 is thus received without play if the diameter of the shank region 322 corresponds to the diameter of the drilling head 324; if the diameter of the drilling head 324 is greater, the insert tool 300 is received with play, or is inserted backward into the front opening 16.

The suction-extraction attachment 10a has four small cutouts 40a in the region of the front opening 16. The cutouts 40a have a mid-point angle α of less than 70° with respect to the longitudinal axis 12. The contact surface 38a is thus interrupted by the cutouts 40a at four points in the circumferential direction. With respect to the longitudinal axis 12a, the four sub-sections of the contact surface 38a are arranged in pairs opposite each other. Advantageously, tilting of the suction-extraction attachment 10a on the workpiece 15 can thus be prevented. However, a different number of cutouts 40a, and thus contact surfaces 38a, is also conceivable.

The housing 13a of the suction-extraction attachment 10a is realized, for example, as a single piece. It is also conceivable, however, for the housing 13a to be composed of two housing half-shells, each having an immovable bearing element 30a realized as a half-tube. The two housing half-shells may have a hinge above the longitudinal axis 12a and, below the longitudinal axis 12a, have latching means for realizing a latching connection of the two housing half-shells. It is thus possible, advantageously, to realize a suction-extraction attachment that can be directly connected to the shank region 322 of the insert tool 300.

Figure 4:
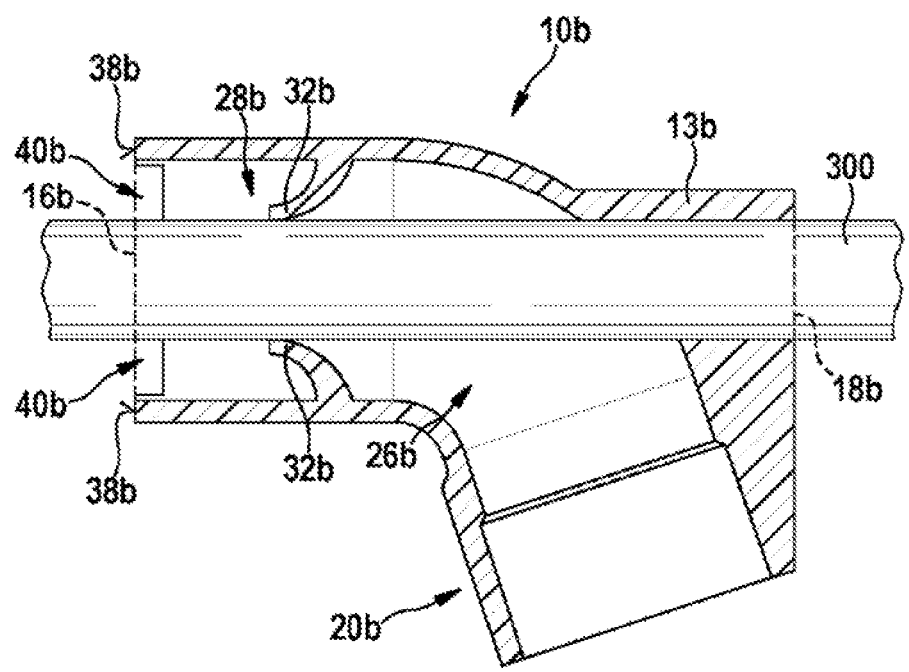
FIG. 4 a longitudinal section of a third embodiment of the suction-extraction attachment.

FIG. 4 shows a further alternative embodiment of the suction-extraction attachment 10b. This embodiment differs, in particular, in the design of the bearing unit 28b. The bearing unit 28b comprises two movable bearing elements 32b. The two bearing elements 32b are arranged opposite each other. The bearing elements 32b are integral with the housing 13b, the housing 13b being composed of an elastic plastic. The movable bearing elements 32b are realized as support elements which, starting from a wall that delimits the transport channel 26b, extend radially inward and apply a force to the insert tool 300 in order to fix it in position.

FIGS. 5a to 5e show further embodiments of the bearing unit, on the basis of cross sections through the coupling region.

Figure 5A:
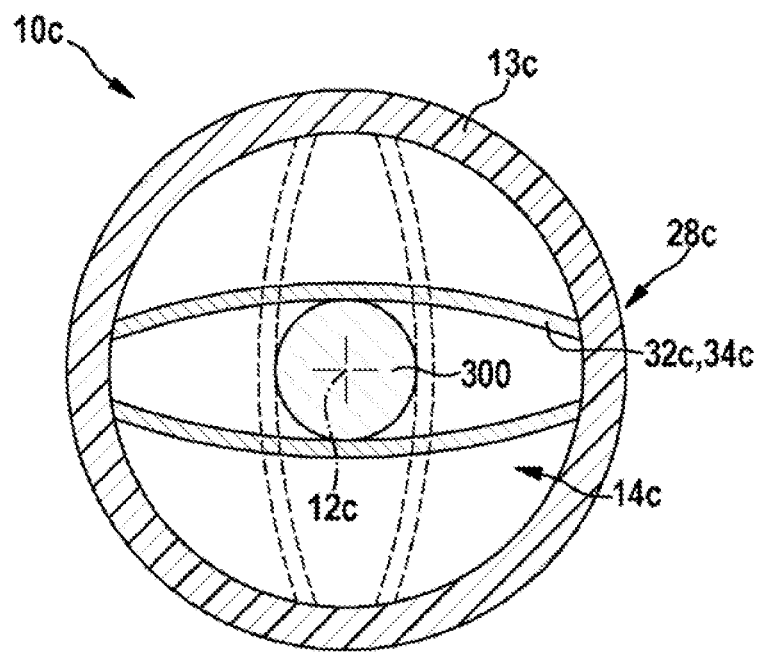
FIG. 5a a cross section through a coupling region of a fourth embodiment of the suction-extraction attachment.

In FIG. 5a, the bearing unit 28c has two movable bearing elements 32c, which are realized as resilient metal strips. The bearing elements 32c are realized so as to be movable relative to each other and to the housing 13c of the suction-extraction attachment 10c. The two bearing elements 32c are arranged, in particular, substantially parallel to each other. The bearing elements 32c are connected to the housing 13c in a form-fitting manner. If the suction-extraction attachment 10c is connected to a drilling tool 302 that has a greater diameter than a distance between the bearing elements 32c in the non-connected state, the bearing elements 32c are moved radially outward by the drilling tool 302, such that the distance between the bearing elements 32c increases. Owing to the resilient property of the bearing elements 32c, a radially opposing restoring force is thus produced upon the drilling tool 302 by the movable bearing elements 32c. Advantageously, centering is effected as a result. The movable bearing element 32c is thus integral with the restoring element 34c. In other words, the function of the movable bearing element 32c and of the restoring element 34c is performed by the same component. Alternatively, it is also conceivable for the bearing unit 28c to have a further pair of bearing elements, extending perpendicularly in relation to the first (indicated by a broken line).

Figure 5B:
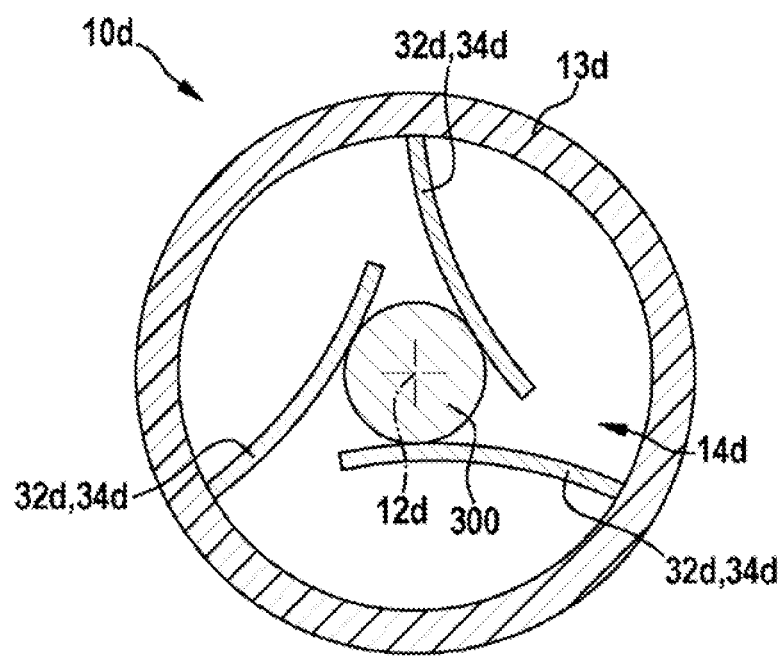
FIG. 5b a cross section through a coupling region of a fifth embodiment of the suction-extraction attachment.

In FIG. 5b, the bearing unit 28d likewise has movable bearing elements 32d, which are integral with the restoring element 34d. The bearing elements 32d are realized as spring bars, in particular as metal spring bars, and at a first end are connected to the housing 13d in a form-fitting manner. Alternatively, it is also conceivable for the bearing elements 32d to be integral with the housing 13d and, in particular, to be made from plastic. The bearing unit 28d has, in particular, three bearing elements 32d, which are arranged symmetrically around the longitudinal axis 12d. In the connected state, the restoring elements 34d bear against a free second end, opposite the first end, tangentially on the drilling tool 302. The bearing elements 32d are deflected in dependence on the diameter of the drilling tool 300, and in turn apply a force to it, according to the degree of deflection.

Figure 5C:
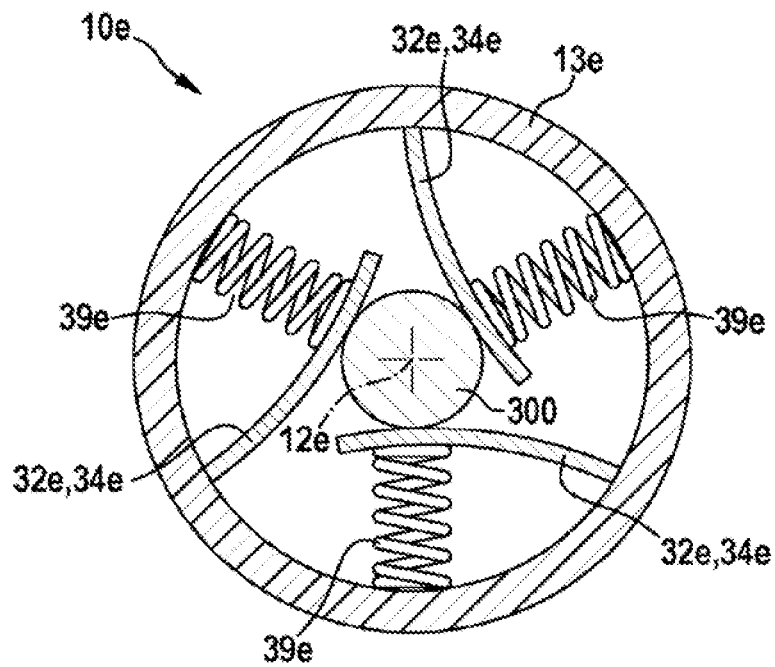
FIG. 5c a cross section through a coupling region of a sixth embodiment of the suction-extraction attachment.

FIG. 5c shows a further alternative embodiment of the bearing unit 28e, which corresponds substantially to the bearing unit of the preceding embodiment. However, the bearing unit 28e has additional restoring elements 39e, which additionally apply a restoring force to the movable bearing elements 32e realized as spring bars. The additional restoring elements 39e are realized, for example, as spiral springs. Alternatively, however, also conceivable are other embodiments of the additional restoring elements 39e that could be used instead of the spiral springs. Advantageously, a particularly durable suction-extraction attachment 10e can thus be realized.

Figure 5D:
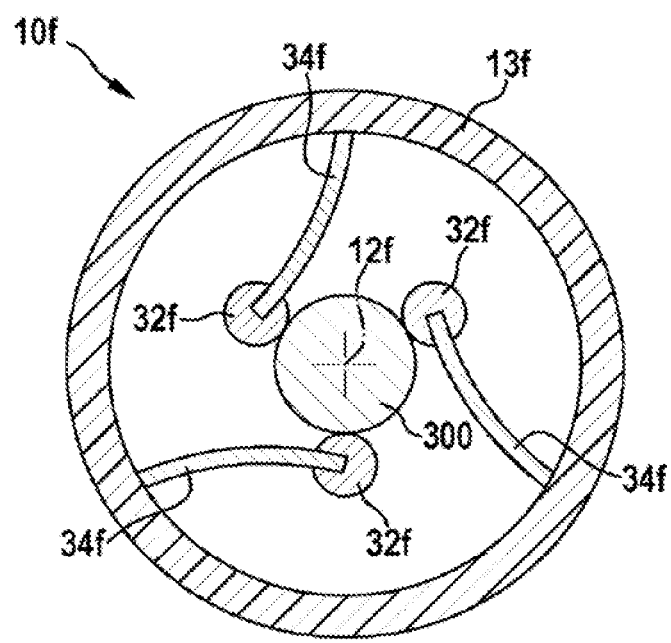
FIG. 5d a cross section through a coupling region of a seventh embodiment of the suction-extraction attachment.

The bearing unit 28f represented in FIG. 5d has three roller-shaped movable bearing elements 32f. The bearing elements 32f are rotatably mounted, with the rotation axis of the bearing elements 32f running parallel to the longitudinal axis 12f. The bearing elements 32f are arranged at one end of the restoring elements 34f realized as spring plates. The bearing unit 28f has three movable bearing elements 32f, which are uniformly spaced apart from each other in the circumferential direction.

Advantageously, wear can be reduced by the rotatable bearing elements 32f.

Figure 5E:
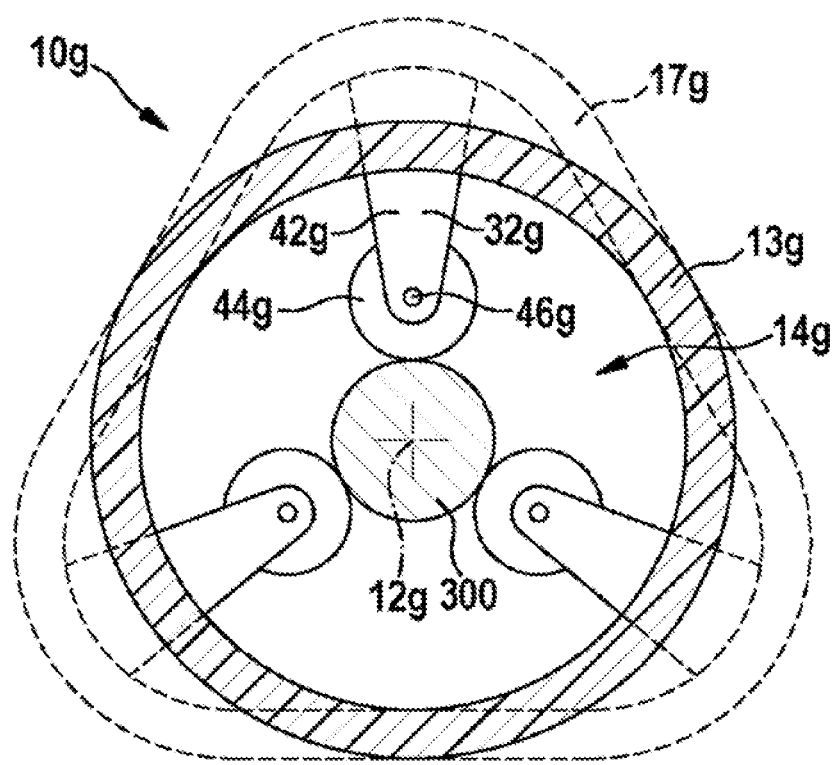
FIG. 5e a cross section through a coupling region of an eighth embodiment of the suction-extraction attachment.

FIG. 5e shows a further alternative embodiment of the bearing unit 28g. The housing 13g is composed of multiple parts and has at least one deformable housing part 17g. The deformable housing part 17g is realized, in particular, in such a manner that it can be brought from a roundish shape into a substantially triangular shape by means of external pressure. Fastened to the inside of the deformable housing part 17g are three bearing elements 32g, which can be moved into differing positions by deformation of the housing part 17g. The bearing elements 32g are each realized as arms 42g, which have a rotatable roller 44g at their end, with the roller 44g bearing against the drilling tool 302. The roller 44g is designed to be rotatable about a rolling axis 46g, which extends parallel to the longitudinal axis 12g. Deformation of the housing part 17g makes it possible, in particular, to adjust the distance between the bearing elements 32g, in particular the rollers 46g, such that the drilling tool 300 is supported substantially without play.

The invention claimed is:

1. A suction-extraction attachment for an insert tool, comprising:
a housing having a front opening that is configured to receive the insert tool;
a bearing unit configured to mount the suction-extraction attachment on the insert tool; and
a suction-extraction opening configured to couple the suction-extraction attachment to a suction-extraction device, the front opening and the suction-extraction opening defining a transport channel,
wherein the suction-extraction attachment is mounted on the insert tool in an axially movable and rotatable manner by the bearing unit such that a position of the suction-extraction attachment relative to the insert tool alters as a drill-hole depth increases,
wherein the bearing unit has at least one movable bearing element that is configured to mount the suction-extraction attachment on the insert tool without play with respect to the insert tool, and
wherein the suction-extraction attachment has an actuating element by which a position of the movable bearing element is configured to be set.

2. The suction-extraction attachment as claimed in claim 1, wherein the front opening has a substantially flat contact surface that encloses a longitudinal axis of the suction-extraction attachment, and wherein the longitudinal axis corresponds to a work axis of the insert tool.

3. The suction-extraction attachment as claimed in claim 2, wherein the housing, in a region of the front opening, has at least one cutout that interrupts the contact surface.

4. The suction-extraction attachment as claimed in claim 3, wherein the cutout has a mid-point angle around the longitudinal axis of at least 10°.

5. The suction-extraction attachment as claimed in claim 4, wherein the mid-point angle is at least 90°.

6. The suction-extraction attachment as claimed in claim 2, wherein the contact surface is intersected twice by at least one straight line that is perpendicular to the longitudinal axis.

7. The suction-extraction attachment as claimed in claim 1, wherein the housing, in a region of the front opening, is configured to increase static friction between a workpiece on which work is to be performed and the suction-extraction attachment.

8. The suction-extraction attachment as claimed in claim 1, wherein the movable bearing element is configured to apply a force to the insert tool.

9. The suction-extraction attachment as claimed in claim 1, wherein the movable bearing element is coupled to a deformable region of the housing.

10. The suction-extraction attachment as claimed in claim 1, wherein the movable bearing element is made from a plastic.

11. The suction-extraction attachment as claimed in claim 10, wherein the movable bearing element is configured at least partially integrally with the housing.

12. The suction-extraction attachment as claimed in claim 1, wherein the movable bearing element is made, at least partially, from a metallic material.

13. A system, comprising:
a suction-extraction device; and
a suction-extraction attachment including:
a housing having a front opening that is configured to receive an insert tool,
a bearing unit configured to mount the suction-extraction attachment on the insert tool, and
a suction-extraction opening configured to couple the suction-extraction attachment to the suction-extraction device, the front opening and the suction-extraction opening defining a transport channel,
wherein the suction-extraction attachment is mounted on the insert tool in an axially movable and rotatable manner by the bearing unit such that a position of the suction-extraction attachment relative to the insert tool alters as a drill-hole depth increases,
wherein a minimum suction force of the suction-extraction attachment on a workpiece on which work is to be performed is greater than a frictional force between the suction-extraction attachment and the insert tool,
wherein the bearing unit has at least one movable bearing element that is configured to mount the suction-extraction attachment on the insert tool without play, and
wherein the suction-extraction attachment has an actuating element by which a position of the movable bearing element is configured to be set.

14. The suction-extraction attachment as claimed in claim 1, wherein the insert tool is configured as a drilling tool.

* * * * *